US011900956B2

(12) United States Patent
Yamamoto et al.

(10) Patent No.: US 11,900,956 B2
(45) **Date of Patent: *Feb. 13, 2024**

(54) SIGNAL PROCESSING DEVICE AND METHOD, AND PROGRAM

(71) Applicant: Sony Group Corporation, Tokyo (JP)

(72) Inventors: Yuki Yamamoto, Chiba (JP); Toru Chinen, Kanagawa (JP); Minoru Tsuji, Chiba (JP)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/154,187

(22) Filed: Jan. 13, 2023

(65) Prior Publication Data

US 2023/0154477 A1 May 18, 2023

Related U.S. Application Data

(63) Continuation of application No. 16/606,276, filed as application No. PCT/JP2018/015352 on Apr. 12, 2018, now Pat. No. 11,574,644.

(30) Foreign Application Priority Data

Apr. 26, 2017 (JP) ................................ 2017-087208

(51) Int. Cl.
*G10L 19/20* (2013.01)
*G10L 25/51* (2013.01)
(Continued)

(52) U.S. Cl.
CPC ............ *G10L 19/20* (2013.01); *G10L 19/008* (2013.01); *G10L 25/51* (2013.01); *G10L 19/02* (2013.01); *G10L 25/78* (2013.01)

(58) Field of Classification Search
None
See application file for complete search history.

(56) References Cited

U.S. PATENT DOCUMENTS 7,032,236 B1 * 4/2006 Ozkan .................. H04N 21/435 725/50
2002/0196947 A1 * 12/2002 Lapicque ................ H04S 1/002 381/17

(Continued)

FOREIGN PATENT DOCUMENTS

CN 106133828 A 11/2016
EP 3059732 A1 8/2016

(Continued)

OTHER PUBLICATIONS

International Search Report and English translation thereof dated Jul. 3, 2018 in connection with International Application No. PCT/JP2018/015352.

(Continued)

*Primary Examiner* — Douglas Godbold
(74) *Attorney, Agent, or Firm* — Wolf, Greenfield & Sacks, P.C.

(57) ABSTRACT

The present technology relates to a signal processing device and method, and a program making it possible to reduce the computational complexity of decoding at low cost.
A signal processing device includes: a priority information generation unit configured to generate priority information about an audio object on the basis of a plurality of elements expressing a feature of the audio object. The present technology may be applied to an encoding device and a decoding device.

17 Claims, 8 Drawing Sheets

(51) Int. Cl.

| | |
|---|---|
| ***G10L 19/008*** | (2013.01) |
| *G10L 19/02* | (2013.01) |
| *G10L 25/78* | (2013.01) |

(56) References Cited

U.S. PATENT DOCUMENTS

| | | | | |
|---|---|---|---|---|
| 2011/0051940 | A1* | 3/2011 | Ishikawa | H04L 12/40013 381/22 |
| 2011/0138991 | A1* | 6/2011 | Tsuchida | A63F 13/54 84/602 |
| 2012/0232910 | A1* | 9/2012 | Dressler | H04S 3/02 704/500 |
| 2014/0233917 | A1* | 8/2014 | Xiang | H04S 3/008 386/285 |
| 2014/0314261 | A1* | 10/2014 | Selig | A61B 5/6898 381/314 |
| 2015/0255076 | A1 | 9/2015 | Fejzo | |
| 2015/0332680 | A1* | 11/2015 | Crockett | G10L 19/20 381/23 |
| 2016/0225377 | A1* | 8/2016 | Miyasaka | G10L 19/008 |
| 2016/0300577 | A1* | 10/2016 | Fersch | H04R 3/12 |
| 2016/0337776 | A1 | 11/2016 | Breebaart et al. | |
| 2016/0358618 | A1* | 12/2016 | Chen | G10L 19/20 |
| 2017/0140763 | A1* | 5/2017 | Yamamoto | G10L 19/20 |
| 2017/0374484 | A1* | 12/2017 | Lando | G10L 19/008 |
| 2018/0115850 | A1* | 4/2018 | De Burgh | H04S 7/30 |
| 2018/0160250 | A1 | 6/2018 | Yamamoto et al. | |
| 2019/0027157 | A1* | 1/2019 | Tsingos | G10L 19/032 |
| 2019/0333361 | A1* | 10/2019 | Gullander | G06T 11/00 |
| 2020/0126582 | A1 | 4/2020 | Yamamoto et al. | |
| 2020/0275233 | A1* | 8/2020 | Mason | H04R 3/12 |
| 2021/0118466 | A1 | 4/2021 | Yamamoto et al. | |
| 2022/0020381 | A1* | 1/2022 | Yamamoto | G10L 19/008 |

FOREIGN PATENT DOCUMENTS

| | | | |
|---|---|---|---|
| EP | 3319342 | A1 | 5/2018 |
| JP | 2015194666 | A | 11/2015 |
| JP | 2016-509249 | A1 | 3/2016 |
| JP | 2017-507365 | A | 3/2017 |
| JP | 2017-508175 | A | 3/2017 |
| JP | 2018510532 | A | 4/2018 |
| WO | WO-2010109918 | A1 | 9/2010 |
| WO | WO 2014/099285 | A1 | 6/2014 |
| WO | WO 2015/056383 | A1 | 4/2015 |
| WO | WO 2015/105748 | A1 | 7/2015 |
| WO | WO 2015/134272 | A1 | 9/2015 |
| WO | WO 2016/126907 | A1 | 8/2016 |
| WO | WO 2016/172111 | A1 | 10/2016 |
| WO | WO 2016/208406 | A1 | 12/2016 |

OTHER PUBLICATIONS

Written Opinion and English translation thereof dated Jul. 3, 2018 in connection with International Application No. PCT/JP2018/015352.

International Preliminary Report on Patentability and English translation thereof dated Nov. 7, 2019 in connection with International Application No. PCT/JP2018/015352.

Extended European Search Report dated Apr. 3, 2020 in connection with European Application No. 18790825.6.

[No Author Listed], Information technology—High efficiency coding and media delivery in heterogeneous environments—Part 3: 3D audio, International Standard ISO/IEC 23008-3, First Edition, Corrected Version, Feb. 1, 2016, 439 pages.

Naef et al., Spatialized audio rendering for immersive virtual environments. Proceedings of the ACM symposium on Virtual reality software and technology. Nov. 2002; pp. 65-72.

Yamamoto et al., Proposed Updates to Dynamic Priority. International Organisation for Standardisation, Coding of Moving Pictures and Audio, ISO/IEC JTC1/SC29/WG11, MPEG2014/M34254. Jul. 2014: 12 pages.

* cited by examiner

SIGNAL PROCESSING DEVICE AND METHOD, AND PROGRAM

CROSS-REFERENCE TO RELATED APPLICATIONS

The present application claims the benefit under 35 U.S.C. § 120 as a continuation application of U.S. application Ser. No. 16/606,276, filed on Oct. 18, 2019, now U.S. Pat. No. 11,574,644, which claims the benefit under 35 U.S.C. § 371 as a U.S. National Stage Entry of International Application No. PCT/JP2018/015352, filed in the Japanese Patent Office as a Receiving Office on Apr. 12, 2018, which claims priority to Japanese Patent Application Number JP2017-087208, filed in the Japanese Patent Office on Apr. 26, 2017, each of which applications is hereby incorporated by reference in its entirety.

TECHNICAL FIELD

The present technology relates to a signal processing device and method, and a program, and more particularly, to a signal processing device and method, and a program making it possible to reduce the computational complexity of decoding at low cost.

BACKGROUND ART

In the related art, for example, the international standard moving picture experts group (MPEG)-H Part 3: 3D audio standard or the like is known as an encoding scheme that can handle object audio (for example, see Non-Patent Document 1).

In such an encoding scheme, a reduction in the computational complexity when decoding is achieved by transmitting priority information indicating the priority of each audio object to the decoding device side.

For example, in the case where there are many audio objects, if it is configured such that only high-priority audio objects are decoded on the basis of the priority information, it is possible to reproduce content with sufficient quality, even with low computational complexity.

CITATION LIST

Non-Patent Document

Non-Patent Document 1: INTERNATIONAL STANDARD ISO/IEC 23008-3 First edition Oct. 15, 2015 Information technology—High efficiency coding and media delivery in heterogeneous environments-Part 3: 3D audio

SUMMARY OF THE INVENTION

Problems to be Solved by the Invention

However, manually assigning priority information to every time and every audio object is costly. For example, with movie content, many audio objects are handled over long periods of time, and therefore the costs of manual work are said to be particularly high.

Also, a large amount of content without assigned priority information also exists. For example, in the MPEG-H Part 3: 3D audio standard described above, whether or not priority information is included in the encoded data can be switched by a flag in the header. In other words, the existence of encoded data without assigned priority information is allowed. Furthermore, there are also audio object encoding schemes in which priority information is not included in the encoded data in the first place.

Given such a background, a large amount of encoded data without assigned priority information exists, and as a result, it has not been possible to reduce the computational complexity of decoding for such encoded data.

The present technology has been devised in light of such circumstances, and makes it possible to reduce the computational complexity of decoding at low cost.

Solutions to Problems

A signal processing device according to an aspect of the present technology includes: a priority information generation unit configured to generate priority information about an audio object on the basis of a plurality of elements expressing a feature of the audio object.

The element may be metadata of the audio object.

The element may be a position of the audio object in a space.

The element may be a distance from a reference position to the audio object in the space.

The element may be a horizontal direction angle indicating a position in a horizontal direction of the audio object in the space.

The priority information generation unit may generate the priority information according to a movement speed of the audio object on the basis of the metadata.

The element may be gain information by which to multiply an audio signal of the audio object.

The priority information generation unit may generate the priority information of a unit time to be processed, on the basis of a difference between the gain information of the unit time to be processed and an average value of the gain information of a plurality of unit times.

The priority information generation unit may generate the priority information on the basis of a sound pressure of the audio signal multiplied by the gain information.

The element may be spread information.

The priority information generation unit may generate the priority information according to an area of a region of the audio object on the basis of the spread information.

The element may be information indicating an attribute of a sound of the audio object.

The element may be an audio signal of the audio object.

The priority information generation unit may generate the priority information on the basis of a result of a voice activity detection process performed on the audio signal.

The priority information generation unit may smooth the generated priority information in a time direction and treat the smoothed priority information as final priority information.

A signal processing method or a program according to an aspect of the present technology includes: a step of generating priority information about an audio object on the basis of a plurality of elements expressing a feature of the audio object.

In an aspect of the present technology, priority information about an audio object is generated on the basis of a plurality of elements expressing a feature of the audio object.

Effects of the Invention

According to an aspect of the present technology, the computational complexity of decoding can be reduced at low cost.

Note that the advantageous effects described here are not necessarily limitative, and any of the advantageous effects described in the present disclosure may be attained.

MODE FOR CARRYING OUT THE INVENTION

Figure 1:
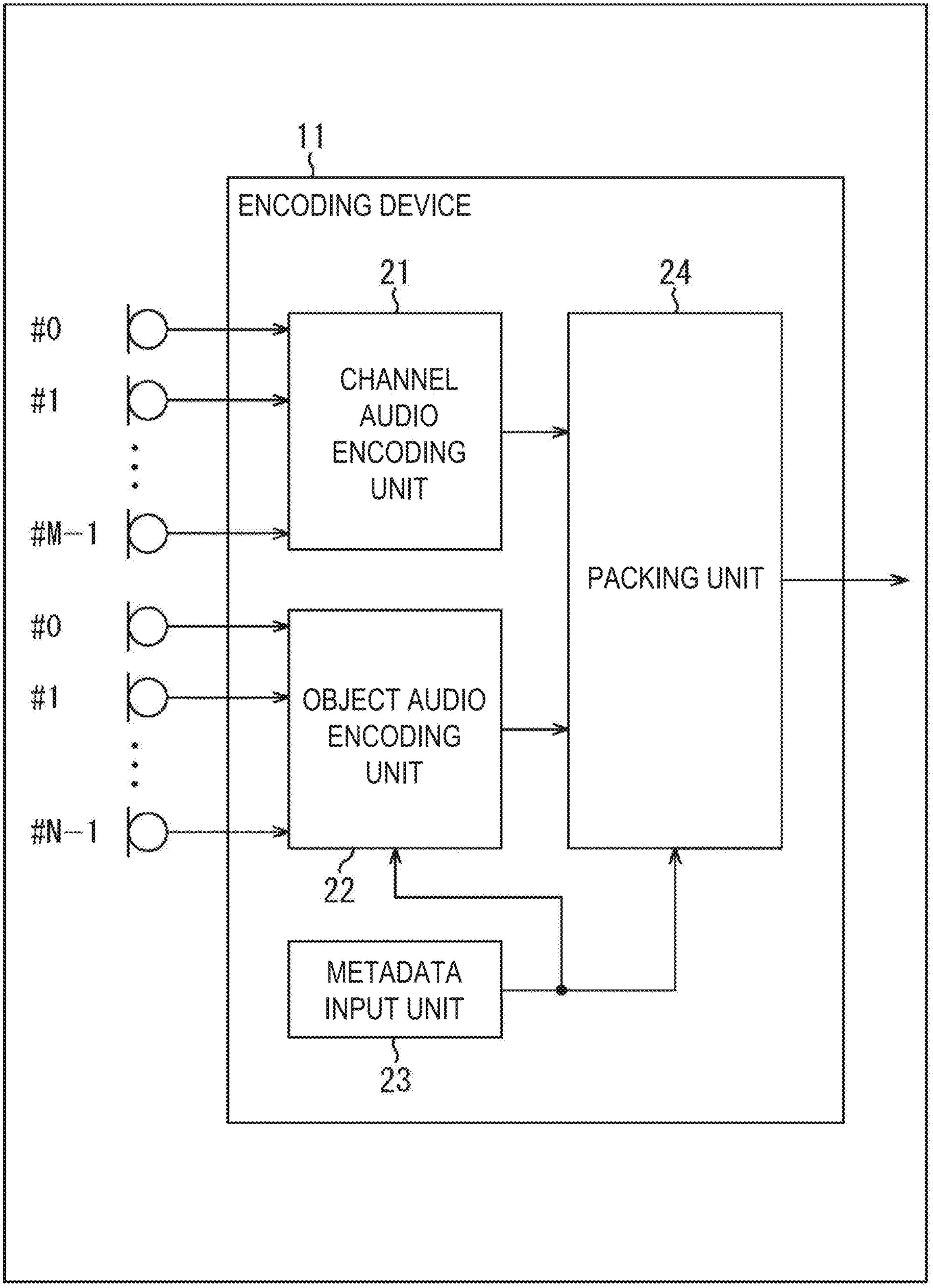
FIG. 1 is a diagram illustrating an exemplary configuration of an encoding device.

Hereinafter, embodiments to which the present technology is applied will be described with reference to the drawings.

First Embodiment

<Exemplary Configuration of Encoding Device>

The present technology is configured to be capable of reducing the computational complexity at low cost by generating priority information about audio objects on the basis of an element expressing features of the audio objects, such as metadata of the audio objects, content information, or the audio signals of the audio objects.

Hereinafter, a multi-channel audio signal and an audio signal of an audio object are described as being encoded in accordance with a predetermined standard or the like. In addition, in the following, an audio object is also referred to simply as an object.

For example, an audio signal of each channel and each object is encoded and transmitted for every frame.

In other words, the encoded audio signal and information needed to decode the audio signal and the like are stored in a plurality of elements (bitstream elements), and a bitstream containing these elements is transmitted from the encoding side to the decoding side.

Specifically, in the bitstream for a single frame for example, a plurality of elements is arranged in order from the beginning, and an identifier indicating a terminal position related to the information about the frame is disposed at the end.

Additionally, the element disposed at the beginning is treated as an ancillary data region called a data stream element (DSE). Information related to each of a plurality of channels, such as information related to downmixing of the audio signal and identification information, is stated in the DSE.

Also, the encoded audio signal is stored in each element following after the DSE. In particular, an element storing the audio signal of a single channel is called a single channel element (SCE), while an element storing the audio signals of two paired channels is called a coupling channel element (CPE). The audio signal of each object is stored in the SCE.

In the present technology, priority information of the audio signal of each object is generated and stored in the DSE.

Herein, priority information is information indicating a priority of an object, and more particularly, a greater value of the priority indicated by the priority information, that is, a greater numerical value indicating the degree of priority, indicates that an object is of higher priority and is a more important object.

In an encoding device to which the present technology is applied, priority information is generated for each object on the basis of the metadata or the like of the object. With this arrangement, the computational complexity of decoding can be reduced even in cases where priority information is not assigned to content. In other words, the computational complexity of decoding can be reduced at low cost, without assigning the priority information manually.

Next, a specific embodiment of an encoding device to which the present technology is applied will be described.

FIG. 1 is a diagram illustrating an exemplary configuration of an encoding device to which the present technology is applied.

An encoding device 11 illustrated in FIG. 1 includes a channel audio encoding unit 21, an object audio encoding unit 22, a metadata input unit 23, and a packing unit 24.

The channel audio encoding unit 21 is supplied with an audio signal of each channel of multichannel audio containing M channels. For example, the audio signal of each channel is supplied from a microphone corresponding to each of these channels. In FIG. 1, the characters from "#0" to "#M−1" denote the channel number of each channel.

The channel audio encoding unit 21 encodes the supplied audio signal of each channel, and supplies encoded data obtained by the encoding to the packing unit 24.

The object audio encoding unit 22 is supplied with an audio signal of each of N objects. For example, the audio signal of each object is supplied from a microphone attached to each of these objects. In FIG. 1, the characters from "#0" to "#N−1" denote the object number of each object.

The object audio encoding unit 22 encodes the supplied audio signal of each object. Also, the object audio encoding unit 22 generates priority information on the basis of the supplied audio signal and metadata, content information, or the like supplied from the metadata input unit 23, and supplies encoded data obtained by encoding and priority information to the packing unit 24.

The metadata input unit 23 supplies the metadata and content information of each object to the object audio encoding unit 22 and the packing unit 24.

For example, the metadata of an object contains object position information indicating the position of the object in a space, spread information indicating the extent of the size of the sound image of the object, gain information indicating the gain of the audio signal of the object, and the like. Also, the content information contains information related to attributes of the sound of each object in the content.

The packing unit 24 packs the encoded data supplied from the channel audio encoding unit 21, the encoded data and the priority information supplied from the object audio encoding unit 22, and the metadata and the content information supplied from the metadata input unit 23 to generate and output a bitstream.

The bitstream obtained in this way contains the encoded data of each channel, the encoded data of each object, the priority information about each object, and the metadata and content information of each object for every frame.

Herein, the audio signals of each of the M channels and the audio signals of each of the N objects stored in the bitstream for a single frame are the audio signals of the same frame that should be reproduced simultaneously.

Note that although an example in which priority information is generated with respect to each audio signal for every frame as the priority information about the audio signal of each object is described herein, a single piece of priority information may also be generated with respect to the audio signal divided into units of any predetermined of time, such as in units of multiple frames for example.

<Exemplary Configuration of Object Audio Encoding Unit>

Figure 2:
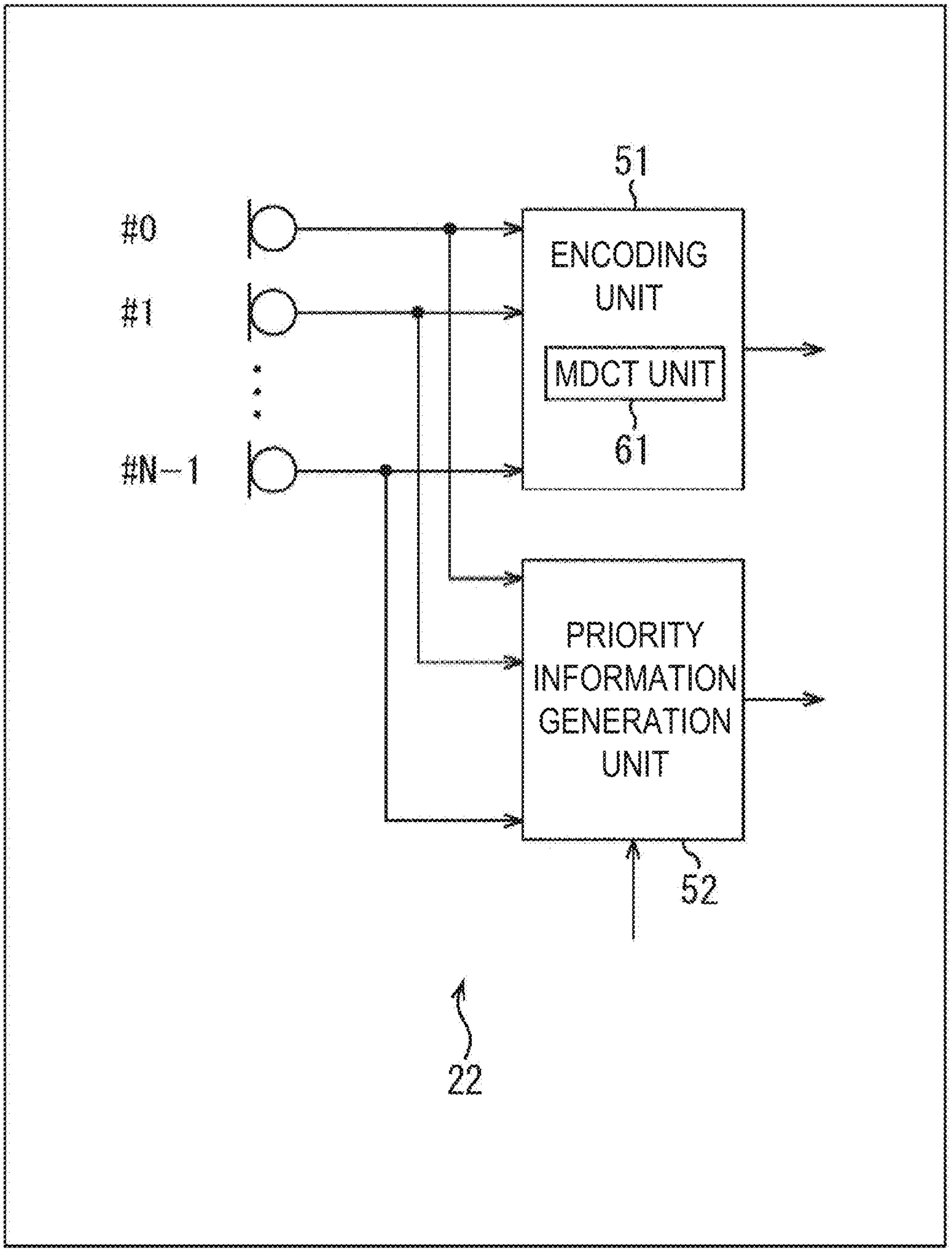
FIG. 2 is a diagram illustrating an exemplary configuration of an object audio encoding unit.

Also, the object audio encoding unit 22 in FIG. 1 is more specifically configured as illustrated in FIG. 2 for example.

The object audio encoding unit 22 illustrated in FIG. 2 is provided with an encoding unit 51 and a priority information generation unit 52.

The encoding unit 51 is provided with a modified discrete cosine transform (MDCT) unit 61, and the encoding unit 51 encodes the audio signal of each object supplied from an external source.

In other words, the MDCT unit 61 performs the modified discrete cosine transform (MDCT) on the audio signal of each object supplied from the external source. The encoding unit 51 encodes the MDCT coefficient of each object obtained by the MDCT, and supplies the encoded data of each object obtained as a result, that is, the encoded audio signal, to the packing unit 24.

Also, the priority information generation unit 52 generates priority information about the audio signal of each object on the basis of at least one of the audio signal of each object supplied from the external source, the metadata supplied from the metadata input unit 23, or the content information supplied from the metadata input unit 23. The generated priority information is supplied to the packing unit 24.

In other words, the priority information generation unit 52 generates the priority information about an object on the basis of one or a plurality of elements that expresses features of the object, such as the audio signal, the metadata, and the content information. For example, the audio signal is an element that expresses features related to the sound of an object, while the metadata is an element that expresses features such as the position of an object, the degree of spread of the sound image, and the gain, and the content information is an element that expresses features related to attributes of the sound of an object.

<About the Generation of Priority Information>

Herein, the priority information about an object generated in the priority information generation unit 52 will be described.

For example, it is also conceivable to generate the priority information on the basis of only the sound pressure of the audio signal of an object.

However, because gain information is stored in the metadata of the object, and an audio signal multiplied by the gain information is used as the final audio signal of the object, the sound pressure of the audio signal changes through the multiplication by the gain information.

Consequently, even if the priority information is generated on the basis of only the sound pressure of the audio signal, it is not necessarily the case that appropriate priority information will be obtained. Accordingly, in the priority information generation unit 52, the priority information is generated by using at least information other than the sound pressure of the audio signal. With this arrangement, appropriate priority information can be obtained.

Specifically, the priority information is generated according to at least one of the methods indicated in (1) to (4) below.

(1) Generate priority information on the basis of the metadata of an object (2) Generate priority information on the basis of other information besides metadata (3) Generate a single piece of priority information by combining pieces of priority information obtained by a plurality of methods (4) Generate a final, single piece of priority information by smoothing priority information in the time direction First, the generation of priority information based on the metadata of an object will be described.

As described above, the metadata of an object contains object position information, spread information, and gain information. Accordingly, it is conceivable to use this object position information, spread information, and gain information to generate the priority information.

(1-1) About Generation of Priority Information Based on Object Position Information First, an example of generating the priority information on the basis of the object position information will be described.

The object position information is information indicating the position of an object in a three-dimensional space, and for example is taken to be coordinate information including a horizontal direction angle a, a vertical direction angle e, and a radius r indicating the position of the object as seen from a reference position (origin).

The horizontal direction angle a is the angle in the horizontal direction (azimuth) indicating the position in the horizontal direction of the object as seen from the reference position, which is the position where the user is present. In other words, the horizontal direction angle is the angle obtained between a direction that serves as a reference in the horizontal direction and the direction of the object as seen from the reference position.

Herein, when the horizontal direction angle a is 0 degrees, the object is positioned directly in front of the user, and when the horizontal direction angle a is 90 degrees or −90 degrees, the object is positioned directly beside the user. Also, when the horizontal direction angle a is 180 degrees or −180 degrees, the object becomes positioned directly behind the user.

Similarly, the vertical direction angle e is the angle in the vertical direction (elevation) indicating the position in the vertical direction of the object as seen from the reference position, or in other words, the angle obtained between a direction that serves as a reference in the vertical direction and the direction of the object as seen from the reference position.

Also, the radius r is the distance from the reference position to the position of the object.

For example, it is conceivable that an object having a short distance from a user position acting as an origin (reference position), that is, an object having a small radius r at a position close to the origin, is more important than an object at a position far away from the origin. Accordingly, it can be configured such that the priority indicated by the priority information is set higher as the radius r becomes smaller.

In this case, for example, the priority information generation unit 52 generates the priority information about an object by evaluating the following Formula (1) on the basis of the radius r of the object. Note that in the following, "priority" denotes the priority information.

[Math. 1]

$$\text{priority}=1/r \quad (1)$$

In the example illustrated in Formula (1), as the radius r becomes smaller, the value of the priority information "priority" becomes greater, and the priority becomes higher.

Also, human hearing is known to be more sensitive in the forward direction than in the backward direction. For this reason, for an object that is behind the user, even if the priority is lowered and a decoding process different from the original one is performed, the impact on the user's hearing is thought to be small.

Accordingly, it can be configured such that the priority indicated by the priority information is set lower for objects more greatly behind the user, that is, for objects at positions closer to being directly behind the user. In this case, for example, the priority information generation unit 52 generates the priority information about an object by evaluating the following Formula (2) on the basis of a horizontal direction angle a of the object. However, in the case in which the horizontal direction angle a is less than 1 degree, the value of the priority information "priority" of the object is set to 1.

[Math. 2]

$$\text{priority}=1/\text{abs}(a) \quad (2)$$

Note that in Formula (2), abs(a) expresses the absolute value of the horizontal direction angle a. Consequently, in this example, the smaller the horizontal direction angle a and the closer the position of the object is to a position in the direction directly in front as seen by the user, the greater the value of the priority information "priority" becomes.

Furthermore, it is conceivable that an object whose object position information changes greatly over time, that is, an object that moves at a fast speed, is highly likely to be an important object in the content. Accordingly, it can be configured such that the priority indicated by the priority information is set higher as the change over time of the object position information becomes greater, that is, as the movement speed of an object becomes faster.

In this case, for example, the priority information generation unit 52 generates the priority information corresponding to the movement speed of an object by evaluating the following Formula (3) on the basis of the horizontal direction angle a, the vertical direction angle e, and the radius r included in the object position information of the object.

[Math. 3]

$$\text{priority}=(a(i)-a(i-1))^2+(e(i)-e(i-1))^2+(r(i)-r(i-1))^2 \quad (3)$$

Note that in Formula (3), a(i), e(i), and r(i) respectively express the horizontal direction angle a, the vertical direction angle e, and the radius r of an object in the current frame to be processed. Also, a(i−1), e(i−1), and r(i−1) respectively express the horizontal direction angle a, the vertical direction angle e, and the radius r of an object in a frame that is temporally one frame before the current frame to be processed.

Consequently, for example, (a(i)−a(i−1)) expresses the speed in the horizontal direction of the object, and the right side of Formula (3) corresponds to the speed of the object as a whole. In other words, the value of the priority information "priority" indicated by Formula (3) becomes greater as the speed of the object becomes faster.

(1-2) About Generation of Priority Information Based on Gain Information

Next, an example of generating the priority information on the basis of the gain information will be described.

For example, a coefficient value by which to multiply the audio signal of an object when decoding is included as gain information in the metadata of the object.

As the value of the gain information becomes greater, that is, as the coefficient value treated as the gain information becomes greater, the sound pressure of the final audio signal of the object after multiplication by the coefficient value becomes greater, and therefore the sound of the object conceivably becomes easier to perceive by human beings. Also, it is conceivable that an object given large gain information to increase the sound pressure is an important object in the content.

Accordingly, it can be configured such that the priority indicated by the priority information about an object is set higher as the value of the gain information becomes greater.

In such a case, for example, the priority information generation unit 52 generates the priority information about an object by evaluating the following Formula (4) on the basis of the gain information of the object, that is, a coefficient value g that is the gain expressed by the gain information.

[Math. 4]

$$\text{priority}=g \quad (4)$$

In the example illustrated in Formula (4), the coefficient value g itself that is the gain information is treated as the priority information "priority".

Also, let a time average value $g_{ave}$ be the time average value of the gain information (coefficient value g) in a plurality of frames of a single object. For example, the time average value $g_{ave}$ is taken to be the time average value of the gain information in a plurality of consecutive frames preceding the frame to be processed or the like.

For example, in a frame having a large difference between the gain information and the time average value $g_{ave}$, or more specifically, in a frame whose coefficient value g is significantly greater than the time average value $g_{ave}$, it is conceivable that the importance of the object is high compared to a frame having a small difference between the coefficient value g and the time average value $g_{ave}$. In other words, in a frame whose coefficient value g has increased suddenly, it is conceivable that the importance of the object is high.

Accordingly, it can be configured such that the priority indicated by the priority information about an object is set higher as the difference between the gain information and the time average value $g_{ave}$ becomes greater.

In such a case, for example, the priority information generation unit 52 generates the priority information about an object by evaluating the following Formula (5) on the basis of the gain information of the object, that is, the coefficient value g, and the time average value $g_{ave}$. In other words, the priority information is generated on the basis of the difference between the coefficient value g in the current frame and the time average value $g_{ave}$.

[Math. 5]

$$\text{priority}=g(i)-g_{ave} \quad (5)$$

In Formula (5), g(i) expresses the coefficient value g in the current frame. Consequently, in this example, the value of the priority information "priority" becomes greater as the coefficient value g(i) in the current frame becomes greater than the time average value $g_{ave}$. In other words, in the example illustrated in Formula (5), in a frame whose gain information has increased suddenly, the importance of an object is taken to be high, and the priority indicated by the priority information also becomes higher.

Note that the time average value $g_{ave}$ may also be an average value of an index based on the gain information (coefficient value g) in a plurality of preceding frames of an object, or an average value of the gain information of an object over the entire content.

(1-3) About Generation of Priority Information Based on Spread Information

Next, an example of generating the priority information on the basis of the spread information will be described.

The spread information is angle information indicating the range of size of the sound image of an object, that is, the angle information indicating the degree of spread of the sound image of the sound of the object. In other words, the spread information can be said to be information that indicates the size of the region of the object. Hereinafter, an angle indicating the extent of the size of the sound image of an object indicated by the spread information will be referred to as the spread angle.

An object having a large spread angle is an object that appears to be large on-screen. Consequently, it is conceivable that an object having a large spread angle is highly likely to be an important object in the content compared to an object having a small spread angle. Accordingly, it can be configured such that the priority indicated by the priority information is set higher for objects having a larger spread angle indicated by the spread information.

In such a case, for example, the priority information generation unit 52 generates the priority information about an object by evaluating the following Formula (6) on the basis of the spread information of the object.

[Math. 6]

$$\text{priority}=s^2 \tag{6}$$

Note that in Formula (6), s expresses the spread angle indicated by the spread information. In this example, to make the area of the region of an object, that is, the breadth of the extent of the sound image, be reflected in the value of the priority information "priority", the square of the spread angle s is treated as the priority information "priority". Consequently, by evaluating Formula (6), priority information according to the area of the region of an object, that is, the area of the region of the sound image of the sound of an object, is generated.

Also, spread angles in mutually different directions, that is, a horizontal direction and a vertical direction perpendicular to each other, are sometimes given as the spread information.

For example, suppose that a spread angle $s_{width}$ in the horizontal direction and a spread angle $s_{height}$ in the vertical direction are included as the spread information. In this case, an object having a different size, that is, an object having a different degree of spread, in the horizontal direction and the vertical direction can be expressed by the spread information.

In the case in which the spread angle $s_{width}$ and the spread angle $s_{height}$ are included as the spread information, the priority information generation unit 52 generates the priority information about an object by evaluating the following Formula (7) on the basis of the spread information of the object.

[Math. 7]

$$\text{priority}=s_{width}\times s_{height} \tag{7}$$

In Formula (7), the product of the spread angle $s_{width}$ and the spread angle $s_{height}$ is treated as the priority information "priority". By generating the priority information according to Formula (7), similarly to the case in Formula (6), it can be configured such that the priority indicated by the priority information is set higher for objects having greater spread angles, that is, as the region of the object becomes larger.

Furthermore, the above describes an example of generating the priority information on the basis of the metadata of an object, namely the object position information, the spread information, and the gain information. However, it is also possible to generate the priority information on the basis of other information besides metadata.

(2-1) About Generation of Priority Information Based on Content Information

First, as an example of generating priority information based on information other than metadata, an example of generating the priority information using content information will be described.

For example, in several object audio encoding schemes, content information is included as information related to each object. For example, attributes of the sound of an object are specified by the content information. In other words, the content information contains information indicating attributes of the sound of the object.

Specifically, for example, whether or not the sound of an object is language-dependent, the type of language of the sound of the object, whether or not the sound of the object is speech, and whether or not the sound of the object is an environmental sound can be specified by the content information.

For example, in the case in which the sound of an object is speech, the object is conceivably more important than an object of another environmental sound or the like. This is because in content such as a movie or news, the amount of information conveyed through speech is greater than the amount of information conveyed through other sounds, and moreover, human hearing is more sensitive to speech.

Accordingly, it can be configured such that the priority of a speech object is set higher than the priority of an object having another attribute.

In this case, for example, the priority information generation unit 52 generates the priority information about an object by evaluating the following Formula (8) on the basis of the content information of the object.

[Math. 8]

```
if object_class=='speech':
    priority=10
else:
    priority=1                                   (8)
```

Note that in Formula (8), object_class expresses an attribute of the sound of an object indicated by the content information. In Formula (8), in the case in which the attribute of the sound of an object indicated by the content information is "speech", the value of the priority information is set to 10, whereas in the case in which the attribute of the sound of the object indicated by the content information is not “speech”, that is, in the case of an environmental sound or the like, for example, the value of the priority information is set to 1.

(2-2) About Generation of Priority Information Based on Audio Signal

Also, whether or not each object is speech can be distinguished by using voice activity detection (VAD) technology.

Accordingly, for example, a VAD process may be performed on the audio signal of an object, and the priority information of the object may be generated on the basis of the detection result (processing result).

Likewise in this case, similarly to the case of utilizing the content information, when a detection result indicating that the sound of the object is speech is obtained as the result of the VAD process, the priority indicated by the priority information is set higher than when another detection result is obtained.

Specifically, for example, the priority information generation unit 52 performs the VAD process on the audio signal of an object, and generates the priority information of the object by evaluating the following Formula (9) on the basis of the detection result.

[Math. 9]

```
if object_class_vad=='speech':
    priority=10
else:
    priority=1                                  (9)
```

Note that in Formula (9), object_class_vad expresses the attribute of the sound of an object obtained as a result of the VAD process. In Formula (9), when the attribute of the sound of an object is speech, that is, when a detection result indicating that the sound of the object is “speech” is obtained as the detection result from the VAD process, the value of the priority information is set to 10. Also, in Formula (9), when the attribute of the sound of an object is not speech, that is, when a detection result indicating that the sound of the object is “speech” is not obtained as the detection result from the VAD process, the value of the priority information is set to 1.

Also, when a value of voice activity likelihood is obtained as the result of the VAD process, the priority information may also be generated on the basis of the value of voice activity likelihood. In such a case, the priority is set higher as the current frame of the object becomes more likely to be voice activity.

(2-3) About Generation of Priority Information Based on Audio Signal and Gain Information Furthermore, as described earlier for example, it is also conceivable to generate the priority information on the basis of only the sound pressure of the audio signal of an object. However, on the decoding side, because the audio signal is multiplied by the gain information included in the metadata of the object, the sound pressure of the audio signal changes through the multiplication by the gain information.

For this reason, even if the priority information is generated on the basis of the sound pressure of the audio signal before multiplication by the gain information, appropriate priority information may not be obtained in some cases. Accordingly, the priority information may be generated on the basis of the sound pressure of a signal obtained by multiplying the audio signal of an object by the gain information. In other words, the priority information may be generated on the basis of the gain information and the audio signal.

In this case, for example, the priority information generation unit 52 multiplies the audio signal of an object by the gain information, and computes the sound pressure of the audio signal after multiplication by the gain information. Subsequently, the priority information generation unit 52 generates the priority information on the basis of the obtained sound pressure. At this time, the priority information is generated such that the priority becomes higher as the sound pressure becomes greater, for example.

The above describes an example of generating the priority information on the basis of an element that expresses features of an object, such as the metadata, the content information, or the audio signal of the object. However, the configuration is not limited to the example described above, and computed priority information, such as the value obtained by evaluating Formula (1) or the like for example, may be further multiplied by a predetermined coefficient or have a predetermined constant added thereto, and the result may be treated as the final priority information.

(3-1) About Generation of Priority Information Based on Object Position Information and Spread Information Also, respective pieces of priority information computed according to a plurality of mutually different methods may be combined (synthesized) by linear combination, non-linear combination, or the like and treated as a final, single piece of priority information. In other words, the priority information may also be generated on the basis of a plurality of elements expressing features of an object.

By combining a plurality of pieces of priority information, that is, by joining a plurality of pieces of priority information together, more appropriate priority information can be obtained.

Herein, first, an example of treating a linear combination of priority information computed on the basis of the object position information and priority information computed on the basis of the spread information as a final, single piece of priority information will be described.

For example, even in a case in which an object is behind the user and less likely to be perceived by the user, when the size of the sound image of the object is large, it is conceivable that the object is an important object. Conversely, even in a case in which an object is in front of a user, when the size of the sound image of the object is small, it is conceivable that the object is not an important object.

Accordingly, for example, the final priority information may be computed by taking a linear sum of priority information computed on the basis of the object position information and priority information computed on the basis of the spread information.

In this case, the priority information generation unit 52 takes a linear combination of a plurality of pieces of priority information by evaluating the following Formula (10) for example, and generates a final, single piece of priority information for an object.

[Math. 10]

$$priority=A\times priority(position)+B\times priority(spread) \quad (10)$$

Note that in Formula (10), priority(position) expresses the priority information computed on the basis of the object position information, while priority(spread) expresses the priority information computed on the basis of the spread information.

Specifically, priority(position) expresses the priority information computed according to Formula (1), Formula (2), Formula (3), or the like, for example. priority(spread) expresses the priority information computed according to Formula (6) or Formula (7) for example.

Also, in Formula (10), A and B express the coefficients of the linear sum. In other words, A and B can be said to express weighting factors used to generate priority information.

For example, the following two setting methods are conceivable as the method of setting these weighting factors A and B.

Namely, as a first setting method, a method of setting equal weights according to the range of the formula for generating the linearly combined priority information (hereinafter also referred to as Setting Method 1) is conceivable. Also, as a second setting method, a method of varying the weighting factor depending on the case (hereinafter also referred to as Setting Method 2) is conceivable.

Herein, an example of setting the weighting factor A and the weighting factor B according to Setting Method 1 will be described specifically.

For example, let priority(position) be the priority information computed according to Formula (2) described above, and let priority(spread) be the priority information computed according to Formula (6) described above.

In this case, the range of the priority information priority (position) is from $1/\pi$ to 1, and the range of the priority information priority(spread) is from 0 to $\pi^2$.

For this reason, in Formula (10), the value of the priority information priority(spread) becomes dominant, and the value of the priority information "priority" that is ultimately obtained will be minimally dependent on the value of the priority information priority(position).

Accordingly, if the ranges of both the priority information priority(position) and the priority information priority (spread) are considered and the ratio of the weighting factor A and the weighting factor B is set to $\pi$:1 for example, final priority information "priority" that is weighted more equally can be generated.

In this case, the weighting factor A becomes $\pi/(\pi+1)$, while the weighting factor B becomes $1/(\pi+1)$.

(3-2) About Generation of Priority Information Based on Content Information and Other Information Furthermore, an example of treating a non-linear combination of respective pieces of priority information computed according to a plurality of mutually different methods as a final, single piece of priority information will be described.

Herein, for example, an example of treating a non-linear combination of priority information computed on the basis of the content information and priority information computed on the basis of information other than the content information as a final, single piece of priority information will be described.

For example, if the content information is referenced, the sound of an object can be specified as speech or not. In the case in which the sound of an object is speech, no matter what kind of information is the other information other than the content information to be used in the generation of the priority information, it is desirable for the ultimately obtained priority information to have a large value. This is because speech objects typically convey a greater amount of information than other objects, and are considered to be more important objects.

Accordingly, in the case of combining priority information computed on the basis of the content information and priority information computed on the basis of information other than the content information to obtain the final priority information, for example, the priority information generation unit 52 evaluates the following Formula (11) using the weighting factors determined by Setting Method 2 described above, and generates a final, single piece of priority information.

[Math. 11]

$$\text{priority}=\text{priority}(\text{object\_class})^{A}+\text{priority}(\text{others})^{B} \quad (11)$$

Note that in Formula (11), priority(object_class) expresses the priority information computed on the basis of the content information, such as the priority information computed according to Formula (8) described above for example. priority(others) expresses the priority information computed on the basis of information other than the content information, such as the object position information, the gain information, the spread information, or the audio signal of the object for example.

Furthermore, in Formula (11), A and B are the values of exponentiation in a non-linear sum, but A and B can be said to express the weighting factors used to generate the priority information.

For example, according to Setting Method 2, if the weighting factors are set such that A=2.0 and B=1.0, in the case in which the sound of the object is speech, the final value of the priority information "priority" becomes sufficiently large, and the priority information does not become smaller than a non-speech object. On the other hand, the magnitude relationship between the priority information of two speech objects is determined by the value of the second term priority(others)$^B$ in Formula (11).

As above, by taking a linear combination or a non-linear combination of a plurality of pieces of priority information computed according to a plurality of mutually different methods, more appropriate priority information can be obtained. Note that the configuration is not limited thereto, and a final, single piece of priority information may also be generated according to a conditional expression for a plurality of pieces of priority information.

(4) Smoothing Priority Information in the Time Direction

Also, the above describes examples of generating priority information from the metadata, content information, and the like of an object, and combining a plurality of pieces of priority information to generate a final, single piece of priority information. However, it is undesirable for the magnitude relationships among the priority information of a plurality of objects to change many times over a short period.

For example, on the decoding side, if the decoding process is switched on or off for each object on the basis of the priority information, the sounds of objects will be alternately audible and not audible on short time intervals because of changes in the magnitude relationships among the priority information of the plurality of objects. If such a situation occurs, the listening experience will be degraded.

The changing (switching) of the magnitude relationships among such priority information becomes more likely to occur as the number of objects increases and also as the technique of generating the priority information becomes more complex.

Accordingly, in the priority information generation unit 52, if for example the calculation expressed in the following Formula (12) is performed and the priority information is smoothed in the time direction by exponential averaging, the switching of the magnitude relationships among the priority information of objects over short time intervals can be suppressed.

[Math. 12]

$$\text{priority\_smooth}(i)=\alpha\times\text{priority}(i)-(1-\alpha)\times\text{priority\_smooth}(i-1) \quad (12)$$

Note that in Formula (12), i expresses an index indicating the current frame, while i−1 expresses an index indicating the frame that is temporally one frame before the current frame.

Also, priority(i) expresses the unsmoothed priority information obtained in the current frame. For example, priority (i) is the priority information computed according to any of Formulas (1) to (11) described above or the like.

Also, priority_smooth(i) expresses the smoothed priority information in the current frame, that is, the final priority information, while priority_smooth(i−1) expresses the smoothed priority information in the frame one before the current frame. Furthermore, in Formula (12), $\alpha$ expresses a smoothing coefficient of exponential averaging, where the smoothing coefficient $\alpha$ takes a value from 0 to 1.

By treating the value obtained by subtracting the priority information priority_smooth(i−1) multiplied by $(1-\alpha)$ from the priority information priority(i) multiplied by the smoothing coefficient $\alpha$ as the final priority information priority_smooth(i), the priority information is smoothed.

In other words, by smoothing, in the time direction, the generated priority information priority(i) in the current frame, the final priority information priority_smooth(i) in the current frame is generated.

In this example, as the value of the smoothing coefficient $\alpha$ becomes smaller, the weight on the value of the unsmoothed priority information priority(i) in the current frame becomes smaller, and as a result, more smoothing is performed, and the switching of the magnitude relationships among the priority information is suppressed.

Note that although smoothing by exponential averaging is described as an example of the smoothing of the priority information, the configuration is not limited thereto, and the priority information may also be smoothed by some other kind of smoothing technique, such as a simple moving average, a weighted moving average, or smoothing using a low-pass filter.

According to the present technology described above, because the priority information of objects is generated on the basis of the metadata and the like, the cost of manually assigning priority information to objects can be reduced. Also, even if there is encoded data in which priority information is not assigned appropriately to objects in any of the times (frames), priority information can be assigned appropriately, and as a result, the computational complexity of decoding can be reduced.

<Description of Encoding Process>

Next, a process performed by the encoding device 11 will be described.

When the encoding device 11 is supplied with the audio signals of each of a plurality of channels and the audio signals of each of a plurality of objects, which are reproduced simultaneously, for a single frame, the encoding device 11 performs an encoding process and outputs a bitstream containing the encoded audio signals.

Hereinafter, the flowchart in FIG. 3 will be referenced to describe the encoding process by the encoding device 11. Note that the encoding process is performed on every frame of the audio signal.

In step S11, the priority information generation unit 52 of the object audio encoding unit 22 generates priority information about the supplied audio signal of each object, and supplies the generated priority information to the packing unit 24.

For example, by receiving an input operation from the user, communicating with an external source, or reading out from an external recording area, the metadata input unit 23 acquires the metadata and the content information of each object, and supplies the acquired metadata and content information to the priority information generation unit 52 and the packing unit 24.

For every object, the priority information generation unit 52 generates the priority information of the object on the basis of at least one of the supplied audio signal, the metadata supplied from the metadata input unit 23, or the content information supplied from the metadata input unit 23.

Specifically, for example, the priority information generation unit 52 generates the priority information of each object according to any of Formulas (1) to (9), according to the method of generating priority information on the basis of the audio signal and the gain information of the object, or according to Formula (10), (11), or (12) described above, or the like.

In step S12, the packing unit 24 stores the priority information about the audio signal of each object supplied from the priority information generation unit 52 in the DSE of the bitstream.

In step S13, the packing unit 24 stores the metadata and the content information of each object supplied from the metadata input unit 23 in the DSE of the bitstream. According to the above process, the priority information about the audio signals of all objects and the metadata as well as the content information of all objects are stored in the DSE of the bitstream.

In step S14, the channel audio encoding unit 21 encodes the supplied audio signal of each channel.

More specifically, the channel audio encoding unit 21 performs the MDCT on the audio signal of each channel, encodes the MDCT coefficients of each channel obtained by the MDCT, and supplies the encoded data of each channel obtained as a result to the packing unit 24.

In step S15, the packing unit 24 stores the encoded data of the audio signal of each channel supplied from the channel audio encoding unit 21 in the SCE or the CPE of the bitstream. In other words, the encoded data is stored in each element disposed following the DSE in the bitstream.

In step S16, the encoding unit 51 of the object audio encoding unit 22 encodes the supplied audio signal of each object.

More specifically, the MDCT unit 61 performs the MDCT on the audio signal of each object, and the encoding unit 51 encodes the MDCT coefficients of each object obtained by the MDCT and supplies the encoded data of each object obtained as a result to the packing unit 24.

In step S17, the packing unit 24 stores the encoded data of the audio signal of each object supplied from the encoding unit 51 in the SCE of the bitstream. In other words, the encoded data is stored in some elements disposed after the DSE in the bitstream.

According to the above process, for the frame being processed, a bitstream storing the encoded data of the audio signals of all channels, the priority information and the encoded data of the audio signals of all objects, and the metadata as well as the content information of all objects is obtained.

In step S18, the packing unit 24 outputs the obtained bitstream, and the encoding process ends.

As above, the encoding device 11 generates the priority information about the audio signal of each object, and outputs the priority information stored in the bitstream. Consequently, on the decoding side, it becomes possible to easily grasp which audio signals have higher degrees of priority.

With this arrangement, on the decoding side, the encoded audio signals can be selectively decoded according to the priority information. As a result, the computational complexity of decoding can be reduced while also keeping the degradation of the sound quality of the sound reproduced by the audio signals to a minimum.

In particular, by storing the priority information about the audio signal of each object in the bitstream, on the decoding side, not only can the computational complexity of decoding be reduced, but the computational complexity of later processes such as rendering can also be reduced.

Also, in the encoding device 11, by generating the priority information of an object on the basis of the metadata and content information of the object, the audio signal of the object, and the like, more appropriate priority information can be obtained at low cost.

Second Embodiment

<Exemplary Configuration of Decoding Device>

Note that although the above describes an example in which the priority information is contained in the bitstream output from the encoding device 11, depending on the encoding device, the priority information may not be contained in the bitstream in some cases.

Therefore, the priority information may also be generated in the decoding device. In such a case, the decoding device that accepts the input of a bitstream output from the encoding device and decodes the encoded data contained in the bitstream is configured as illustrated in FIG. 4, for example.

Figure 4:
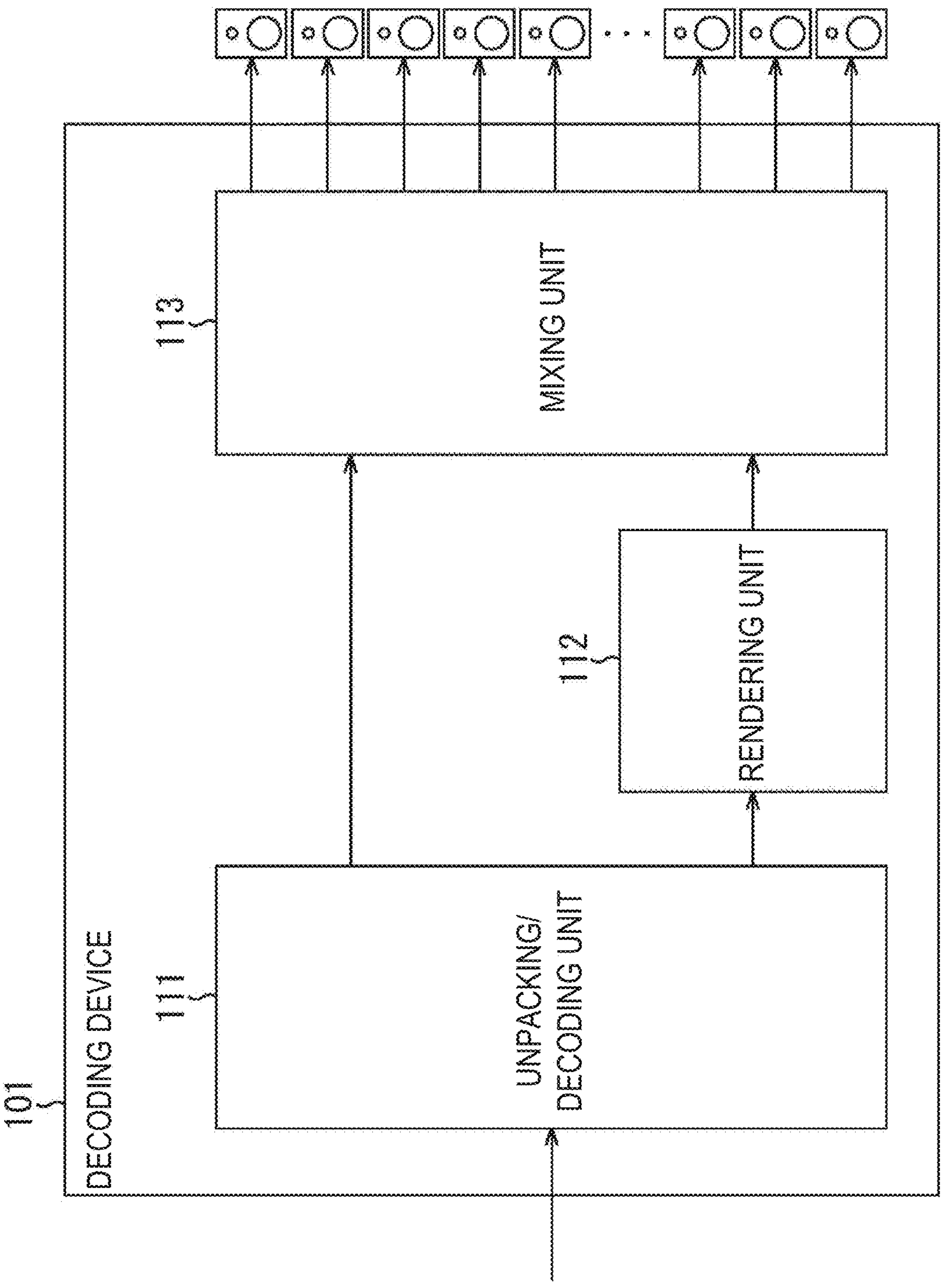
FIG. 4 is a diagram illustrating an exemplary configuration of a decoding device.

A decoding device 101 illustrated in FIG. 4 includes an unpacking/decoding unit 111, a rendering unit 112, and a mixing unit 113.

The unpacking/decoding unit 111 acquires the bitstream output from the encoding device, and in addition, unpacks and decodes the bitstream.

The unpacking/decoding unit 111 supplies the audio signal of each object and the metadata of each object obtained by unpacking and decoding to the rendering unit 112. At this time, the unpacking/decoding unit 111 generates priority information about each object on the basis of the metadata and the content information of the object, and decodes the encoded data of each object according to the obtained priority information.

Also, the unpacking/decoding unit 111 supplies the audio signal of each channel obtained by unpacking and decoding to the mixing unit 113.

The rendering unit 112 generates the audio signals of M channels on the basis of the audio signal of each object supplied from the unpacking/decoding unit 111 and the object position information contained in the metadata of each object, and supplies the generated audio signals to the mixing unit 113. At this time, the rendering unit 112 generates the audio signal of each of the M channels such that the sound image of each object is localized at a position indicated by the object position information of each object.

The mixing unit 113 performs a weighted addition of the audio signal of each channel supplied from the unpacking/decoding unit 111 and the audio signal of each channel supplied from the rendering unit 112 for every channel, and generates a final audio signal of each channel. The mixing unit 113 supplies the final audio signal of each channel obtained in this way to external speakers respectively corresponding to each channel, and causes sound to be reproduced.

<Exemplary Configuration of Unpacking/Decoding Unit>

Figure 5:
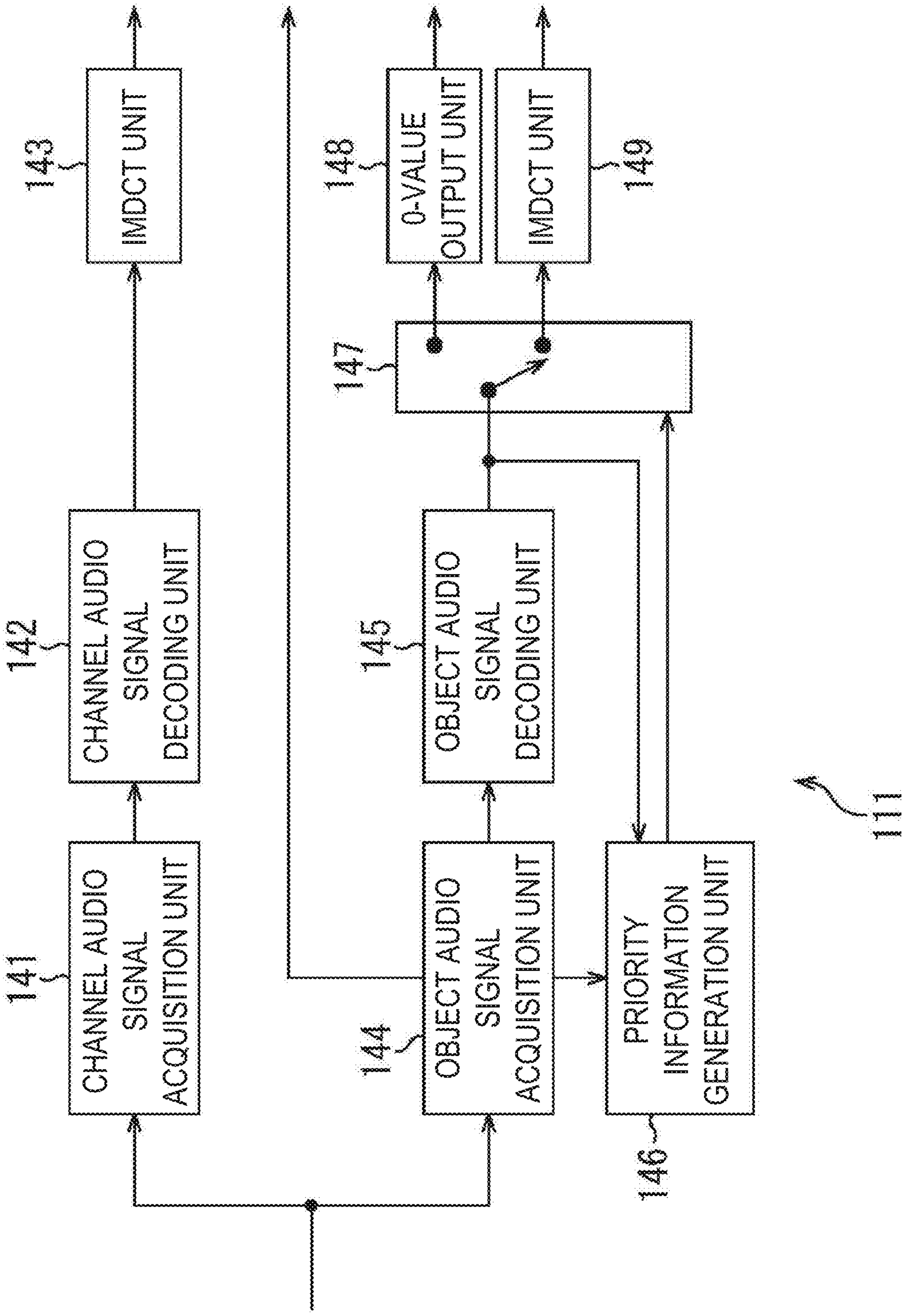
FIG. 5 is a diagram illustrating an exemplary configuration of an unpacking/decoding unit.

Also, the unpacking/decoding unit 111 of the decoding device 101 illustrated in FIG. 4 is more specifically configured as illustrated in FIG. 5 for example.

The unpacking/decoding unit 111 illustrated in FIG. 5 includes a channel audio signal acquisition unit 141, a channel audio signal decoding unit 142, an inverse modified discrete cosine transform (IMDCT) unit 143, an object audio signal acquisition unit 144, an object audio signal decoding unit 145, a priority information generation unit 146, an output selection unit 147, a 0-value output unit 148, and an IMDCT unit 149.

The channel audio signal acquisition unit 141 acquires the encoded data of each channel from the supplied bitstorm, and supplies the acquired encoded data to the channel audio signal decoding unit 142.

The channel audio signal decoding unit 142 decodes the encoded data of each channel supplied from the channel audio signal acquisition unit 141, and supplies MDCT coefficients obtained as a result to the IMDCT unit 143.

The IMDCT unit 143 performs the IMDCT on the basis of the MDCT coefficients supplied from the channel audio signal decoding unit 142 to generate an audio signal, and supplies the generated audio signal to the mixing unit 113.

In the IMDCT unit 143, the inverse modified discrete cosine transform (IMDCT) is performed on the MDCT coefficients, and an audio signal is generated.

The object audio signal acquisition unit 144 acquires the encoded data of each object from the supplied bitstream, and supplies the acquired encoded data to the object audio signal decoding unit 145. Also, the object audio signal acquisition unit 144 acquires the metadata as well as the content information of each object from the supplied bitstream, and supplies the metadata as well as the content information to the priority information generation unit 146 while also supplying the metadata to the rendering unit 112.

The object audio signal decoding unit 145 decodes the encoded data of each object supplied from the object audio signal acquisition unit 144, and supplies the MDCT coefficients obtained as a result to the output selection unit 147 and the priority information generation unit 146.

The priority information generation unit 146 generates priority information about each object on the basis of at least one of the metadata supplied from the object audio signal acquisition unit 144, the content information supplied from the object audio signal acquisition unit 144, or the MDCT coefficients supplied from the object audio signal decoding unit 145, and supplies the generated priority information to the output selection unit 147.

On the basis of the priority information about each object supplied from the priority information generation unit 146, the output selection unit 147 selectively switches the output destination of the MDCT coefficients of each object supplied from the object audio signal decoding unit 145.

In other words, in the case in which the priority information for a certain object is less than a predetermined threshold value Q, the output selection unit 147 supplies 0 to the 0-value output unit 148 as the MDCT coefficients of that object. Also, in the case in which the priority information about a certain object is the predetermined threshold value Q or greater, the output selection unit 147 supplies the MDCT coefficients of that object supplied from the object audio signal decoding unit 145 to the IMDCT unit 149.

Note that the value of the threshold value Q is determined appropriately according to the computing power and the like of the decoding device 101 for example. By appropriately determining the threshold value Q, the computational complexity of decoding the audio signals can be reduced to a computational complexity that is within a range enabling the decoding device 101 to decode in real-time.

The 0-value output unit 148 generates an audio signal on the basis of the MDCT coefficients supplied from the output selection unit 147, and supplies the generated audio signal to the rendering unit 112. In this case, because the MDCT coefficients are 0, a silent audio signal is generated.

The IMDCT unit 149 performs the IMDCT on the basis of the MDCT coefficients supplied from the output selection unit 147 to generate an audio signal, and supplies the generated audio signal to the rendering unit 112.

<Description of Decoding Process>

Next, the operations of the decoding device 101 will be described.

When a bitstream for a single frame is supplied from the encoding device, the decoding device 101 performs a decoding process to generate and output audio signals to the speakers. Hereinafter, the flowchart in FIG. 6 will be referenced to describe the decoding process performed by the decoding device 101.

In step S51, the unpacking/decoding unit 111 acquires of the bitstream transmitted from the encoding device. In other words, the bitstream is received.

In step S52, the unpacking/decoding unit 111 performs a selective decoding process.

Note that although the details of the selective decoding process will be described later, in the selective decoding process, the encoded data of each channel is decoded, while in addition, priority information about each object is generated, and the encoded data of each object is selectively decoded on the basis of the priority information.

Additionally, the audio signal of each channel is supplied to the mixing unit 113, while the audio signal of each object is supplied to the rendering unit 112. Also, the metadata of each object acquired from the bitstream is supplied to the rendering unit 112.

In step S53, the rendering unit 112 renders the audio signals of the objects on the basis of the audio signals of the objects as well as the object position information contained in the metadata of the objects supplied from the unpacking/decoding unit 111.

For example, the rendering unit 112 generates the audio signal of each channel according to vector base amplitude panning (VBAP) on the basis of the object position information such that the sound image of an objects is localized at a position indicated by the object position information, and supplies the generated audio signals to the mixing unit 113. Note that in the case in which spread information is contained in the metadata, a spread process is also performed on the basis of the spread information during rendering, and the sound image of an object is spread out.

In step S54, the mixing unit 113 performs a weighted addition of the audio signal of each channel supplied from the unpacking/decoding unit 111 and the audio signal of each channel supplied from the rendering unit 112 for every channel, and supplies the resulting audio signals to external speakers. With this arrangement, because each speaker is supplied with an audio signal of a channel corresponding to the speaker, each speaker reproduces sound on the basis of the supplied audio signal.

When the audio signal of each channel is supplied to a speaker, the decoding process ends.

As above, the decoding device 101 generates priority information and decodes the encoded data of each object according to the priority information.

<Description of Selective Decoding Process>

Figure 6:
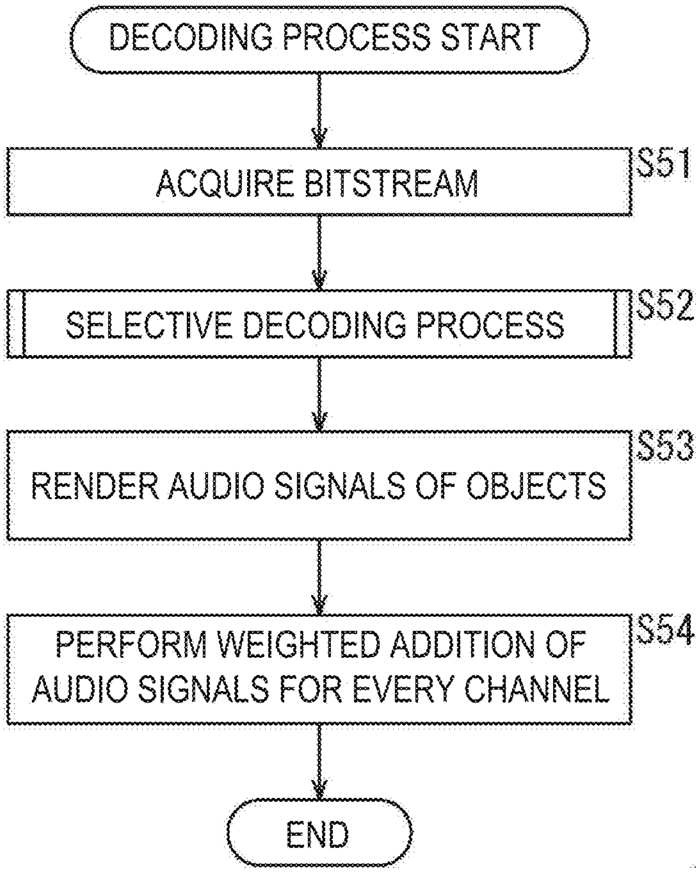
FIG. 6 is a flowchart explaining a decoding process.
Figure 7:
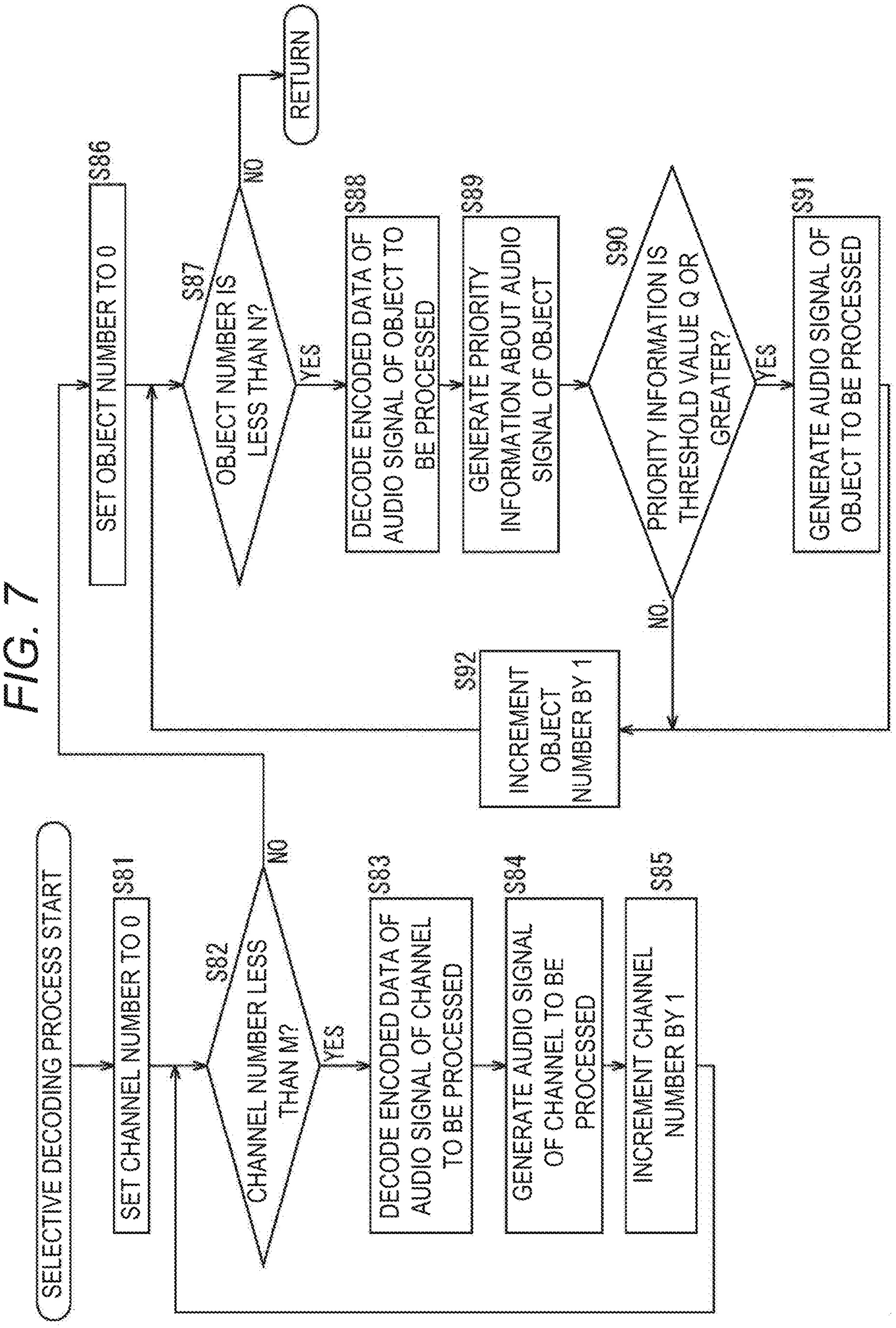
FIG. 7 is a flowchart explaining a selective decoding process.

Next, the flowchart in FIG. 7 will be referenced to describe the selective decoding process corresponding to the process in step S52 of FIG. 6.

In step S81, the channel audio signal acquisition unit 141 sets the channel number of the channel to be processed to 0, and stores the set channel number.

In step S82, the channel audio signal acquisition unit 141 determines whether or not the stored channel number is less than the number of channels M.

In step S82, in the case of determining that the channel number is less than M, in step S83, the channel audio signal decoding unit 142 decodes the encoded data of the audio signal of the channel to be processed.

In other words, the channel audio signal acquisition unit 141 acquires the encoded data of the channel to be processed from the supplied bitstream, and supplies the acquired encoded data to the channel audio signal decoding unit 142. Subsequently, the channel audio signal decoding unit 142 decodes the encoded data supplied from the channel audio signal acquisition unit 141, and supplies MDCT coefficients obtained as a result to the IMDCT unit 143.

In step S84, the IMDCT unit 143 performs the IMDCT on the basis of the MDCT coefficients supplied from the channel audio signal decoding unit 142 to generate an audio signal of the channel to be processed, and supplies the generated audio signal to the mixing unit 113.

In step S85, the channel audio signal acquisition unit 141 increments the stored channel number by 1, and updates the channel number of the channel to be processed.

After the channel number is updated, the process returns to step S82, and the process described above is repeated. In other words, the audio signal of the new channel to be processed is generated.

Also, in step S82, in the case of determining that the channel number of the channel to be processed is not less than M, audio signals have been obtained for all channels, and therefore the process proceeds to step S86.

In step S86, the object audio signal acquisition unit 144 sets the object number of the object to be processed to 0, and stores the set object number.

In step S87, the object audio signal acquisition unit 144 determines whether or not the stored object number is less than the number of objects N.

In step S87, in the case of determining that the object number is less than N, in step S88, the object audio signal decoding unit 145 decodes the encoded data of the audio signal of the object to be processed.

In other words, the object audio signal acquisition unit 144 acquires the encoded data of the object to be processed from the supplied bitstream, and supplies the acquired encoded data to the object audio signal decoding unit 145. Subsequently, the object audio signal decoding unit 145 decodes the encoded data supplied from the object audio signal acquisition unit 144, and supplies MDCT coefficients obtained as a result to the priority information generation unit 146 and the output selection unit 147.

Also, the object audio signal acquisition unit 144 acquires the metadata as well as the content information of object to be processed from the supplied bitstream, and supplies the metadata as well as the content information to the priority information generation unit 146 while also supplying the metadata to the rendering unit 112.

In step S89, the priority information generation unit 146 generates priority information about the audio signal of the object to be processed, and supplies the generated priority information to the output selection unit 147.

In other words, the priority information generation unit 146 generates priority information on the basis of at least one of the metadata supplied from the object audio signal acquisition unit 144, the content information supplied from the object audio signal acquisition unit 144, or the MDCT coefficients supplied from the object audio signal decoding unit 145.

Figure 3:
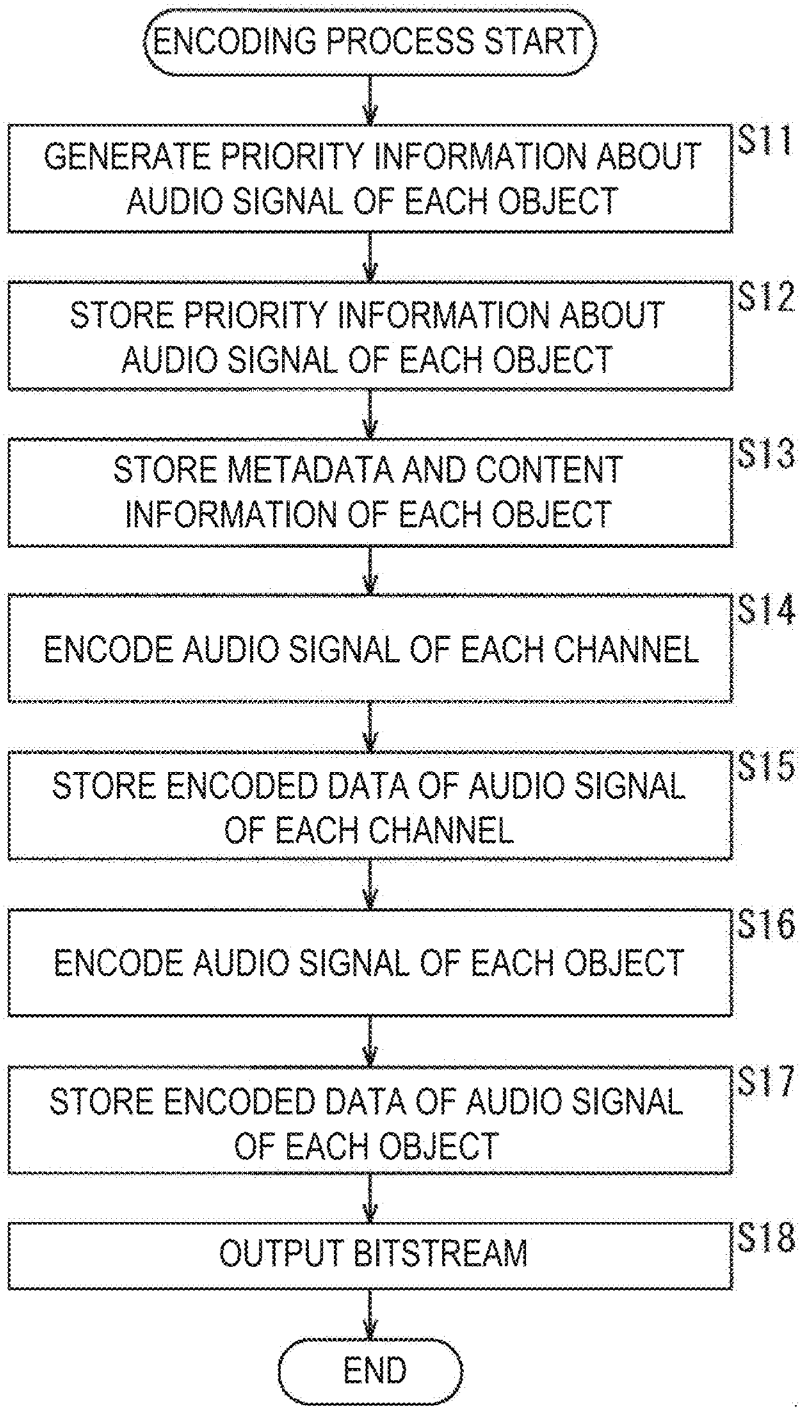
FIG. 3 is a flowchart explaining an encoding process.

In step S89, a process similar to step S11 in FIG. 3 is performed and priority information is generated. Specifically, for example, the priority information generation unit 146 generates the priority information of an object according to any of Formulas (1) to (9) described above, according to the method of generating priority information on the basis of the sound pressure of the audio signal and the gain information of the object, or according to Formula (10), (11), or (12) described above, or the like. For example, in the case in which the sound pressure of the audio signal is used to generate the priority information, the priority information generation unit 146 uses the sum of squares of the MDCT coefficients supplied from the object audio signal decoding unit 145 as the sound pressure of the audio signal.

In step S90, the output selection unit 147 determines whether or not the priority information about the object to be processed supplied from the priority information generation unit 146 is equal to or greater than the threshold value Q specified by a higher-layer control device or the like not illustrated. Herein, the threshold value Q is determined according to the computing power and the like of the decoding device 101 for example.

In step S90, in the case of determining that the priority information is the threshold value Q or greater, the output selection unit 147 supplies the MDCT coefficients of the object to be processed supplied from the object audio signal decoding unit 145 to the IMDCT unit 149, and the process proceeds to step S91. In this case, the object to be processed is decoded, or more specifically, the IMDCT is performed.

In step S91, the IMDCT unit 149 performs the IMDCT on the basis of the MDCT coefficients supplied from the output selection unit 147 to generate an audio signal of the object to be processed, and supplies the generated audio signal to the rendering unit 112. After the audio signal is generated, the process proceeds to step S92.

Conversely, in step S90, in the case of determining that the priority information is less than the threshold value Q, the output selection unit 147 supplies 0 to the 0-value output unit 148 as the MDCT coefficients.

The 0-value output unit 148 generates the audio signal of the object to be processed from the zeroed MDCT coefficients supplied from the output selection unit 147, and supplies the generated audio signal to the rendering unit 112. Consequently, in the 0-value output unit 148, substantially no processing for generating an audio signal, such as the IMDCT, is performed. In other words, the decoding of the encoded data, or more specifically, the IMDCT with respect to the MDCT coefficients, substantially is not performed.

Note that the audio signal generated by the 0-value output unit 148 is a silent signal. After the audio signal is generated, the process proceeds to step S92.

In step S90, if it is determined that the priority information is less than the threshold value Q, or in step S91, if an audio signal is generated in step S91, in step S92, the object audio signal acquisition unit 144 increments the stored object number by 1, and updates the object number of the object to be processed.

After the object number is updated, the process returns to step S87, and the process described above is repeated. In other words, the audio signal of the new object to be processed is generated.

Also, in step S87, in the case of determining that the object number of the object to be processed is not less than N, audio signals have been obtained for all channels and required objects, and therefore the selective decoding process ends, and after that, the process proceeds to step S53 in FIG. 6.

As above, the decoding device 101 generates priority information about each object and decodes the encoded audio signals while comparing the priority information to a threshold value and determining whether or not to decode each encoded audio signal.

With this arrangement, only the audio signals having a high degree of priority can be selectively decoded to fit the reproduction environment, and the computational complexity of decoding can be reduced while also keeping the degradation of the sound quality of the sound reproduced by the audio signals to a minimum.

Moreover, by decoding the encoded audio signals on the basis of the priority information about the audio signal of each object, it is possible to reduce not only the computational complexity of decoding the audio signals but also the computational complexity of later processes, such as the processes in the rendering unit 112 and the like.

Also, by generating priority information about objects on the basis of the metadata and content information of the objects, the MDCT coefficients of the objects, and the like, appropriate priority information can be obtained at low cost, even in cases where the bitstream does not contain priority information. Particularly, in the case of generating the priority information in the decoding device 101, because it is not necessary to store the priority information in the bitstream, the bit rate of the bitstream can also be reduced.

<Exemplary Configuration of Computer>

Incidentally, the above-described series of processes may be performed by hardware or may be performed by software. In the case where the series of processes is performed by software, a program forming the software is installed into a computer. Here, examples of the computer include a computer that is incorporated in dedicated hardware and a general-purpose personal computer that can perform various types of function by installing various types of programs.

Figure 8:
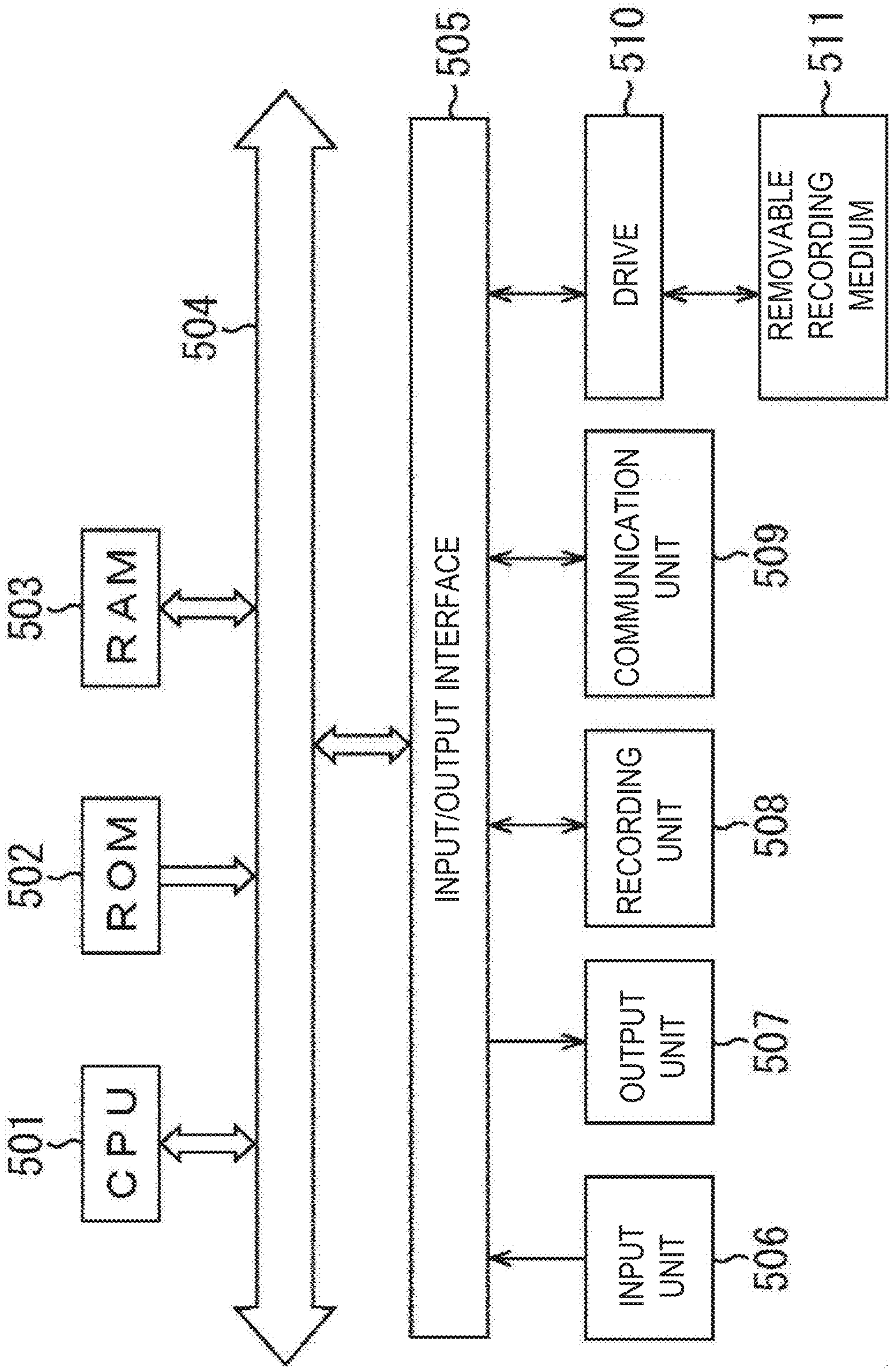
FIG. 8 is a diagram illustrating an exemplary configuration of a computer.

FIG. 8 is a block diagram illustrating a configuration example of the hardware of a computer that performs the above-described series of processes with a program.

In the computer, a central processing unit (CPU) 501, a read only memory (ROM) 502, and a random access memory (RAM) 503 are mutually connected by a bus 504.

Further, an input/output interface 505 is connected to the bus 504. Connected to the input/output interface 505 are an input unit 506, an output unit 507, a recording unit 508, a communication unit 509, and a drive 510.

The input unit 506 includes a keyboard, a mouse, a microphone, an image sensor, and the like. The output unit 507 includes a display, a speaker, and the like. The recording unit 508 includes a hard disk, a non-volatile memory, and the like. The communication unit 509 includes a network interface, and the like. The drive 510 drives a removable recording medium 511 such as a magnetic disk, an optical disc, a magneto-optical disk, and a semiconductor memory.

In the computer configured as described above, the CPU 501 loads a program that is recorded, for example, in the recording unit 508 onto the RAM 503 via the input/output interface 505 and the bus 504, and executes the program, thereby performing the above-described series of processes.

For example, programs to be executed by the computer (CPU 501) can be recorded and provided in the removable recording medium 511, which is a packaged medium or the like. In addition, programs can be provided via a wired or wireless transmission medium such as a local area network, the Internet, and digital satellite broadcasting.

In the computer, by mounting the removable recording medium 511 onto the drive 510, programs can be installed into the recording unit 508 via the input/output interface 505. In addition, programs can also be received by the communication unit 509 via a wired or wireless transmission medium, and installed into the recording unit 508. In addition, programs can be installed in advance into the ROM 502 or the recording unit 508.

Note that a program executed by the computer may be a program in which processes are chronologically carried out in a time series in the order described herein or may be a program in which processes are carried out in parallel or at necessary timing, such as when the processes are called.

In addition, embodiments of the present technology are not limited to the above-described embodiments, and various alterations may occur insofar as they are within the scope of the present technology.

For example, the present technology can adopt a configuration of cloud computing, in which a plurality of devices shares a single function via a network and performs processes in collaboration.

Furthermore, each step in the above-described flowcharts can be executed by a single device or shared and executed by a plurality of devices.

In addition, in the case where a single step includes a plurality of processes, the plurality of processes included in the single step can be executed by a single device or shared and executed by a plurality of devices.

Additionally, the present technology may also be configured as below.

(1)

A signal processing device including:

a priority information generation unit configured to generate priority information about an audio object on the basis of a plurality of elements expressing a feature of the audio object.

(2)

The signal processing device according to (1), in which the element is metadata of the audio object.

(3)

The signal processing device according to (1) or (2), in which the element is a position of the audio object in a space.

(4)

The signal processing device according to (3), in which the element is a distance from a reference position to the audio object in the space.

(5)

The signal processing device according to (3), in which the element is a horizontal direction angle indicating a position in a horizontal direction of the audio object in the space.

(6)

The signal processing device according to any one of (2) to (5), in which the priority information generation unit generates the priority information according to a movement speed of the audio object on the basis of the metadata.

(7)

The signal processing device according to any one of (1) to (6), in which the element is gain information by which to multiply an audio signal of the audio object.

(8)

The signal processing device according to (7), in which the priority information generation unit generates the priority information of a unit time to be processed, on the basis of a difference between the gain information of the unit time to be processed and an average value of the gain information of a plurality of unit times.

(9)

The signal processing device according to (7), in which the priority information generation unit generates the priority information on the basis of a sound pressure of the audio signal multiplied by the gain information.

(10)

The signal processing device according to any one of (1) to (9), in which the element is spread information.

(11)

The signal processing device according to (10), in which the priority information generation unit generates the priority information according to an area of a region of the audio object on the basis of the spread information.

(12)

The signal processing device according to any one of (1) to (11), in which the element is information indicating an attribute of a sound of the audio object.

(13)

The signal processing device according to any one of (1) to (12), in which the element is an audio signal of the audio object.

(14)

The signal processing device according to (13), in which the priority information generation unit generates the priority information on the basis of a result of a voice activity detection process performed on the audio signal.

(15)

The signal processing device according to any one of (1) to (14), in which the priority information generation unit smooths the generated priority information in a time direction and treats the smoothed priority information as final priority information.

(16)

A signal processing method including:

a step of generating priority information about an audio object on the basis of a plurality of elements expressing a feature of the audio object.

(17)

A program causing a computer to execute a process including:

a step of generating priority information about an audio object on the basis of a plurality of elements expressing a feature of the audio object.

REFERENCE SIGNS LIST

11 Encoding device
22 Object audio encoding unit

23 Metadata input unit
51 Encoding unit
52 Priority information generation unit
101 Decoding device
111 Unpacking/decoding unit
144 Object audio signal acquisition unit
145 Object audio signal decoding unit
146 Priority information generation unit
147 Output selection unit

The invention claimed is:

1. A signal processing device comprising:

processing circuitry configured to generate priority information about an audio object on a basis of at least one element expressing a feature of the audio object, wherein the element includes spread information, wherein the processing circuitry is configured to generate the priority information according to a product of a horizontal directional spread angle and a vertical directional spread angle, and wherein an audio signal of the audio object is decoded by a decoding device according to the priority information.

2. The signal processing device according to claim 1, wherein the element comprises metadata of the audio object.

3. The signal processing device according to claim 2, wherein the element comprises an indication of a position of the audio object in a space.

4. The signal processing device according to claim 3, wherein the element comprises a distance from a reference position to the audio object in the space.

5. The signal processing device according to claim 3, wherein the element comprises a horizontal direction angle indicating a position in a horizontal direction of the audio object in the space.

6. The signal processing device according to claim 2, wherein the processing circuitry is configured to generate the priority information according to a movement speed of the audio object on a basis of the metadata.

7. The signal processing device according to claim 1, wherein the element comprises gain information by which to multiply an audio signal of the audio object.

8. The signal processing device according to claim 7, wherein the processing circuitry is configured to generate the priority information of a unit time to be processed, on a basis of a difference between the gain information of the unit time to be processed and an average value of the gain information of a plurality of unit times.

9. The signal processing device according to claim 7, wherein the processing circuitry is configured to generate the priority information on a basis of a sound pressure of the audio signal multiplied by the gain information.

10. The signal processing device according to claim 1, wherein the processing circuitry is configured to generate the priority information according to an area of a region of the audio object on a basis of the spread information.

11. The signal processing device according to claim 1, wherein the spread information comprises angle information indicating a range of size of a sound image of the audio object.

12. The signal processing device according to claim 1, wherein the element comprises information indicating an attribute of a sound of the audio object.

13. The signal processing device according to claim 1, wherein the element is indicative of an audio signal of the audio object.

14. The signal processing device according to claim 13, wherein the processing circuitry is configured to generate the priority information on a basis of a result of a voice activity detection process performed on the audio signal.

15. The signal processing device according to claim 1, wherein the processing circuitry is configured to smooth the generated priority information in a time direction and to treat the smoothed priority information as final priority information.

16. A signal processing method executed by processing circuitry, the method comprising:

generating priority information about an audio object on a basis of at least one element expressing a feature of the audio object, wherein the element includes spread information, wherein the priority information is generated according to a product of a horizontal directional spread angle and a vertical directional spread angle, and wherein an audio signal of the audio object is decoded by a decoding device according to the priority information.

17. A non-transitory computer readable medium containing instructions that, when executed by processing circuitry, perform a process comprising:

generating priority information about an audio object on a basis of at least one element expressing a feature of the audio object, wherein the element includes spread information, wherein the priority information is generated according to a product of a horizontal directional spread angle and a vertical directional spread angle, and wherein an audio signal of the audio object is decoded by a decoding device according to the priority information.

* * * * *